United States Patent [19]

Asai et al.

[11] Patent Number: 4,726,992
[45] Date of Patent: Feb. 23, 1988

[54] MAGNETIC RECORDING MEDIUM

[75] Inventors: Takamitsu Asai; Masaaki Fujiyama; Takahito Miyoshi; Yasuyuki Yamada, all of Kanagawa, Japan

[73] Assignee: Fuji Photo Film Co., Ltd., Kanagawa, Japan

[21] Appl. No.: 873,922

[22] Filed: Jun. 13, 1986

[30] Foreign Application Priority Data

Jun. 17, 1985 [JP]  Japan ................................ 60-131477

[51] Int. Cl.4 .......................... G11B 5/70; G11B 5/702
[52] U.S. Cl. .................................... 428/329; 428/323; 428/412; 428/423.1; 428/425.9; 428/694; 428/900
[58] Field of Search .................. 428/412, 423.1, 425.9, 428/694, 900, 323, 329; 427/128

[56]  References Cited

U.S. PATENT DOCUMENTS

| 4,431,712 | 2/1984 | Matsufuji et al. | 428/694 |
| 4,452,863 | 6/1984 | Takizawa et al. | 428/694 |
| 4,486,496 | 12/1984 | Dezawa et al. | 428/694 |
| 4,552,808 | 11/1985 | Fujiyama et al. | 427/128 |
| 4,562,117 | 12/1985 | Kukawa et al. | 428/900 |
| 4,565,726 | 1/1986 | Oguchi et al. | 428/900 |
| 4,568,612 | 2/1986 | Lehner et al. | 428/694 |
| 4,600,650 | 7/1986 | Hosaka et al. | 428/425.9 |
| 4,607,068 | 8/1986 | Ansel | 428/425.9 |

Primary Examiner—Paul J. Thibodeau
Attorney, Agent, or Firm—Sughrue, Mion, Zinn, Macpeak & Seas

[57]  ABSTRACT

A magnetic recording medium is described, comprising a non-magnetic support having provided thereon a magnetic layer having magnetic particles being ferromagnetic hexagonal crystallized tabular shape particles having an axis of easy magnetization in a direction vertical to a flat surface thereof, said binder being present in an amount of from 10 to 30 wt % based on the weight of the magnetic particles, and said binder comprising a polycarbonate polyurethane being present in an amount of from 20 to 60 wt %, a vinyl chloride and vinyl acetate type copolymer being present in an amount of from 20 to 70 wt %, and a polyisocyanate being present in an amount of from 10 to 60 wt %, based on the total amount of binder.

8 Claims, No Drawings

MAGNETIC RECORDING MEDIUM

FIELD OF THE INVENTION

The present invention relates to a magnetic recording medium, and more particularly it relates to a magnetic recording medium having excellent dispersibility of the magnetic coating composition, excellent electromagnetic properties, and excellent running durability.

BACKGROUND OF THE INVENTION

As a magnetic recording medium (hereinafter referred to merely as "magnetic tape" in some cases) for audio recording, video recording, or for computers, generally a magnetic recording medium (e.g., in the form of a tape or disk) comprising a non-magnetic support having coated thereon a magnetic layer having dispersed in a binder ferromagnetic particles consisting of acicular crystals such as $\gamma\text{-}Fe_2O_3$, Co-containing magnetic iron oxide, and $CrO_2$ has been used.

However, with the recent increased demand for high density recording in a magnetic recording medium, hexagonal crystallized ferrite particles such as substitution products of barium ferrite, strontium ferrite, lead ferrite, or calcium ferrite, manganese bismuth, and hexagonal crystallized cobalt alloy have been developed as alternatives conventionally used ferromagnetic particles. These particles are very suitable as ferromagnetic particles of a magnetic recording medium for high density recording because they are ferromagnetic hexagonal crystallized tabular shape particles having an axis of easy magnetization in a direction vertical to its flat surface.

Particularly for a video tape, with the increased tendency that recording wavelength is shortened and that width of the recording tracks is narrowed, extremely high density recording has been required. Also, a video tape using ferromagnetic particles (hereinafter referred to as a "barium ferrite, etc.") which are hexagonal crystallized tabular shape particles have an axis of easy magnetization in a direction vertical to their flat surface has come to be used.

When powder of "barium ferrite, etc." is used, it is known that higher density recording can be achieved by smoothing the surface of a magnetic layer, and therefore electromagnetic properties of a magnetic recording medium can be improved.

However, when the surface of a magnetic layer is made smooth, the friction coefficient of contact surface between a magnetic layer and an apparatus system is increased during tape running, whereby the magnetic layer tends to be damaged or even peeled apart in some cases in a short time period. Particularly for a video tape, a magnetic layer is sometimes put under harsh conditions, such as when the magnetic layer is put into a still mode. Therefore, the increase of friction coefficient of a magnetic layer leads to shortened life (still life) of the magnetic layer in the still mode. Accordingly, improvement of running durability of a magnetic layer of a video tape has been desired.

Hitherto, a polyester polyurethane resin has been used as an effective binder to improve wear resistance of a magnetic layer, and further as an improved usage, carbonate polyester polyurethane has been proposed. Binders such as polyvinyl chloride and nitrocellulsoe and the like can be mixed to increase lubricity of the polyurethane. Further, it is proposed that various organic additives such as lauric acid, myristic acid, oleic acid or dispersing agents of esters thereof are used in order to improve dispersibility and surface smoothness. However, in a conventional method, fine powder of "barium ferrite, etc." cannot be dispersed with a binder used in a relatively small amount, and output, dispersibility, and running durability cannot be improved at the same time.

SUMMARY OF THE INVENTION

An object of the present invention is to provide a magnetic recording medium having improved electromagnetic properties and running durability simultaneously. More particularly, an object of the present invention is to provide a magnetic recording medium containing ferromagnetic hexagonal crystallized tabular shape particles, having improved dispersibility, surface smoothness, and electromagnetic properties due to improved reproduced output and at the same time improved running durability due to decrease of the friction coefficient of a magnetic layer.

In this connection, the inventors of the present invention made extensive research as to features of powder of "barium ferrite, etc.", various additives and binders, and as a result, they found that certain kinds of binders and certain mixing ratios thereof can overcome the problems associated with the use of such powder of "barium ferrite, etc.", and have thus attained the present invention.

The present invention relates to a magnetic recording medium comprising a non-magnetic support having provided thereon a magnetic layer having magnetic particles dispersed in a binder, the magnetic particles being ferromagnetic hexagonal crystallized tabular shape particles having an axis of easy magnetization in a direction vertical to a flat surface thereof, said binder being present in an amount of from 10 to 30 wt% based on the weight of the magnetic particles, and said binder comprising a polycarbonate polyurethane being present in an amount of from 20 to 60 wt%, a vinyl chloride and vinyl acetate type copolymer being present in an amount of from 20 to 70 wt%, and a polyisocyanate being present in an amount of from 10 to 60 wt%, based on the total amount of binder.

DETAILED DESCRIPTION OF THE INVENTION

A magnetic recording medium of the present invention has a fundamental structure wherein a magnetic layer containing ferromagnetic particles which are ferromagnetic hexagonal crystallized tabular shape particles having an axis of easy magnetization in a direction vertical to the flat surface of the particles is provided on a non-magnetic support.

The non-magnetic supports used in the present invention include those that are conventionally used. Typical examples of materials for the supports include various synthetic resin films such as polyethylene terephthalate, polypropylene, polycarbonate, polyethylene naphthalate, polyamide, polyamideimide or polyimide and metal foils such as aluminum foil, or stainless steel foil. The thickness of the non-magnetic support is generally from 3 to 50 $\mu$m, preferably from 5 to 30 $\mu$m, and more preferably from 5 to 10 $\mu$m.

A backing layer may be provided on the opposite surface of the non-magnetic support to the magnetic layer.

A magnetic recording medium of the present invention comprises a non-magnetic support having provided thereon a magnetic layer containing ferromagnetic particles which are ferromagnetic hexagonal crystallized tabular shape particles having an axis of easy magnetization in a direction vertical to the flat surface of the particles.

Typical examples of ferromagnetic hexagonal crystallized tabular shape particles having an axis of easy magnetization in a direction vertical to a flat surface thereof, which are contained in a magnetic layer of a magnetic recording medium according to the present invention, include hexagonal crystallized ferrite particles such as substitution products of barium ferrite, strontium ferrite, lead ferrite, or calcium ferrite, manganese bismuth, and hexagonal cobalt alloy. Among those, Co-substituted barium ferrite and strontium ferrite are particularly preferred. The ferromagnetic hexagonal crystallized tabular shape particles have a tabular diameter (average particle size) or preferably from 0.01 to 10 μm, more preferably from 0.03 to 0.10 μm, a tabular thickness (average thickness) of preferably from 0.005 to 5 μm, and more preferably from 0.015 to 0.05 μm.

The coercive force of the ferromagnetic particles is generally from 300 to 3,000 Oe, and preferably from 400 to 2,000 Oe.

The tabular ratio (tabular diameter/tabular thickness) is preferably 2/1 or more, and more preferably is from 2.5/1 to 10/1.

In the present invention, it is essential that polycarbonate polyurethanes, vinyl chloride and vinyl acetate type copolymers and polyisocyanates are used as a binder in combination with the ferromagnetic particles which are ferromagnetic hexagonal crystallized tabular shape particles having an axis of easy magnetization in a direction vertical to a flat surface thereof.

Polycarbonate polyurethanes used in the present invention can be prepared by a condensation reaction of (1) polyol, (2) polyisocyanate, and, if necessary, (3) a chain extending agent.

Polyol (1) referred to herein is polycarbonate polyol obtained by a condensation reaction of polyhydric alcohol having a molecular weight of 300 to 20,000, a hydroxyl value of 20 to 300, which can be represented by formula (I):

HO—R—OH    (I)

wherein R represents

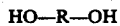 (n = 3 to 14),

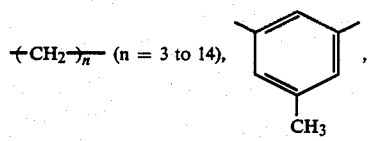

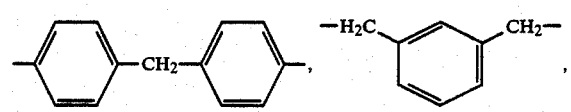

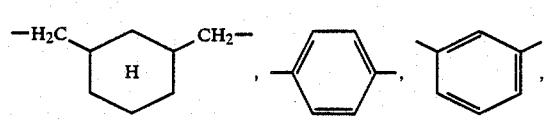

diols containing a tertiary amino group in a molecular chain thereof, which are obtained by an addition reaction of primary amines represented by formula: $C_nH_{2n+1}$—$NH_2$ (n=1 to 20) with 2 to 50 mols of oxides such as ethylene oxide, propylene oxide, and butylene oxide, or derivatives thereof, and a phosgene, a chloroacetic acid ester, dialkyl carbonate or a diallyl carbonate; or is polyester polyol having a molecular weight of 300 to 20,000 and hydroxyl value of 5 to 300, which is obtained by a condensation reaction of the above-described polycarbonate polyol with a compound represented by formula (II):

HOOCR'COOH    (II)

wherein R' represents

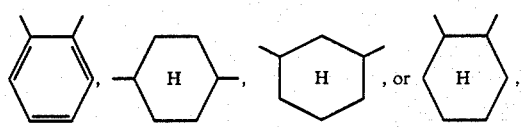 (n = 3 to 6),

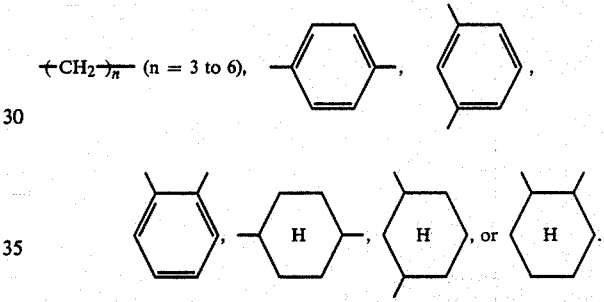

Further, other polyols, such as polyether polyols, polyester polyols, and polyesters other than the above can be also used.

Polyisocyanate (2) can be selected from those such as hexamethylene diisocyanate, lysine diisocyanate, isophorone diisocyanate, xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, and 1,5-naphthylene diisocyanate.

Chain extending agents (3) are those conventionally used, such as above-described polyhydric alcohols, aliphatic polyamines, alicyclic polyamines, aromatic polyamines, and the like.

Polycarbonate polyurethanes comprising (1), (2) and (3) has generally an average molecular weight of from 10,000 to 120,000. If the molecular weight thereof is lower than this coverage, durability of a tape deteriorates. If the molecular weight thereof is more than the above, the solubility of the resins deteriorates, which is undesirable from an industrial standpoint.

Vinyl chloride and vinyl acetate type copolymers used in the present invention include a copolymer of vinyl chloride and vinyl acetate, a copolymer of vinyl chloride, vinyl acetate and vinyl alcohol, and a copolymer of vinyl chloride, vinyl acetate and maleic anhydride. Among these, a copolymer of vinyl chloride, vinyl acetate and maleic anhydride is particularly preferred.

Polyisocyanates used in the present invention include conventionally known polyisocyanates such as tolylene diisocyanate, 4,4'-diphenylmethane diisocyanate, xylylene diisocyanate, 1,5-naphthylene diisocyanate, hexamethylene diisocyanate and isophorone diisocyanate and the like. Among these, tolylene diisocyanate and 4,4'-diphenylmethane diisocyanate are preferred.

The binder is used in an amount of from 10 to 30 wt%, and preferably from 15 to 25 wt%, based on the weight of ferromagnetic particles. If the coverage is less than 10 wt%, running durability such as still life deteriorates, while if the coverage is more than 30 wt%, desired electromagnetic properties cannot be obtained and the friction coefficient increases due to low packing density.

The polycarbonate polyurethanes are used in an amount of from 20 to 60 wt%, and preferably from 25 to 50 wt%, based on the total amount of binder. Vinyl chloride and vinyl acetate type copolymers are used in an amount of from 20 to 70 wt%, and preferably from 25 to 55 wt%, based on the total amount of binder.

The polyisocyanates are used in an amount of from 10 to 60 wt%, and preferably from 15 to 45 wt%, based on the total amount of binder.

It is particularly important in the present invention that the ferromagnetic particles and polycarbonate polyurethanes should be used in a prescribed relationship and that the polycarbonate polyurethanes, vinyl chloride and vinyl acetate type copolymers, and polyisocyanates should be present in the above-described ranges.

If the mixing ratios are outside the above-described ranges, the following problems arise.

As the increase of the amount of polycarbonate polyurethanes, friction coefficient tends to increase, and with the increase of the amount of vinyl chloride and vinyl acetate type copolymers, running durability deteriorates. More specifically, still durability reduces and bridging of the magnetic head gap easily occurs. Further, with the increase of the amount of polyisocyanate, still durability deteriorates.

As the decrease of the amount of polycarbonate polyurethanes, reproducing output and still life deteriorate, and with the decrease of the amount of vinyl chloride and vinyl acetate type copolymers, gloss reduces. Further, with the decrease of the amount of polyisocyanate, still life deteriorates.

The ferromagnetic particles, non-magnetic particles, binders, additives, solvents, supports which may have an undercoating layer, a backing layer, or an undercoating layer for the backing layer, and a method for preparing a magnetic recording medium, used in the present invention are disclosed in U.S. Pat. No. 4,135,016.

The thickness of the magnetic layer is generally from 0.1 to 10 microns, and preferably from 0.5 to 5 microns.

The present invention is explained in more detail by the following examples and comparative examples. In examples and comparative examples, all parts are by weight.

EXAMPLE

A magnetic coating composition having the following compositions was prepared and was coated on a non-magnetic polyethylene terephthalate support having a thickness of 10 $\mu$m to have a 3.0 $\mu$m thickness of the magnetic layer after drying.

| Magnetic Coating Composition: | |
|---|---|
| Co-Substituted Ba ferrite (coercive force: 700 Oe) (average particle size and thickness are shown in the Table) | 100 parts |
| Copolymer of vinyl chloride, vinyl acetate and maleic anhydride (400 × 110A, manufactured by Nippon Zeon Co., Ltd.) (shown in the Table) | Amount shown in the Table |
| Urethane resin (shown in the Table) | Amount shown in the Table |
| Polyisocyanate ("Collonate L", trademark for product manufactured by Nippon Polyurethane Co., Ltd.) | Amount shown in the Table |
| Carbon black (average particle size: 0.04 $\mu$m) | 2 parts |
| Methyl ethyl ketone | 300 parts |

After coating a magnetic coating composition and drying it, the magnetic layer was subjected to calendering treatment and was slit to a width of ½ inch to prepare a VHS type video tape.

Regarding each sample of video tapes thus obtained, gloss, reproduced outputs, friction coefficient and still life were measured and the results thereof are shown in the Table.

TABLE

| | Tabular Diameter and Thickness | | Amount of Binder Based on Ferromagnetic Particles (wt %) | Amount with Respect to Total Binder (wt %) | | | |
|---|---|---|---|---|---|---|---|
| Sample No. | Diameter ($\mu$m) | Thickness ($\mu$m) | | Polycarbonate Polyurethane | Polyester Polyurethane | Copolymer of Vinyl Chloride, Vinyl Acetate and Maleic Anhydride | Polyisocyanate |
| 1 E | 0.07 | 0.025 | 20 | 35 | — | 35 | 30 |
| 2 E | 0.10 | 0.025 | 20 | 35 | — | 35 | 30 |
| 3 E | 0.12 | 0.025 | 20 | 35 | — | 35 | 30 |
| 4 C | 0.07 | 0.025 | 20 | — | 35 | 35 | 30 |
| 5 C | 0.12 | 0.025 | 20 | — | 35 | 35 | 30 |
| 6 C | 0.07 | 0.025 | 8 | 35 | — | 35 | 30 |
| 7 C | 0.07 | 0.025 | 35 | 35 | — | 35 | 30 |
| 8 E | 0.07 | 0.025 | 20 | 20 | — | 20 | 60 |
| 9 E | 0.07 | 0.025 | 20 | 25 | — | 60 | 15 |
| 10 E | 0.07 | 0.025 | 20 | 55 | — | 25 | 20 |
| 11 C | 0.07 | 0.025 | 20 | 15 | — | 15 | 70 |
| 12 C | 0.07 | 0.025 | 20 | 10 | — | 75 | 15 |
| 13 C | 0.07 | 0.025 | 20 | 70 | — | 20 | 10 |
| 14 E | 0.07 | 0.025 | 10 | 20 | — | 70 | 10 |
| 15 E | 0.07 | 0.025 | 30 | 60 | — | 20 | 20 |

Gloss    Reproduced Output    Friction

TABLE-continued

| Sample No. | (%) | (dB) | Coefficient | Still Life | |
|---|---|---|---|---|---|
| 1 E | 220 | +4.0 | 0.20 | At least 60 minutes | A |
| 2 E | 215 | +3.0 | 0.20 | At least 60 minutes | A |
| 3 E | 205 | +2.5 | 0.20 | At least 60 minutes | A |
| 4 C | 200 | +0.5 | 0.23 | 50 minutes | B |
| 5 C | 190 | 0 | 0.23 | 50 minutes | B |
| 6 C | 200 | +1.0 | 0.19 | 5 minutes | B |
| 7 C | 220 | +2.0 | 0.38 | At least 60 minutes | A |
| 8 E | 222 | +4.0 | 0.20 | At least 60 minutes | A |
| 9 E | 220 | +4.0 | 0.20 | At least 60 minutes | A |
| 10 E | 220 | +4.0 | 0.21 | At least 60 minutes | A |
| 11 C | 225 | +2.0 | 0.22 | 20 minutes | B |
| 12 C | 210 | +1.0 | 0.20 | 15 minutes | B |
| 13 C | 220 | +2.0 | 0.37 | 50 minutes | B |
| 14 E | 210 | +3.0 | 0.20 | At least 60 minutes | A |
| 15 E | 220 | +2.5 | 0.30 | At least 60 minutes | A |

*Note: E indicates an example and C indicates a comparative example.

The evaluations shown in the Table were made in the following manner.

Method for Measuring Gloss of a Surface of a Magnetic Layer:

Gloss was measured in accordance with JIS Z-8741 assuming that gloss of glass surface at 45° incident angle with refractive index of 1.567 was 100%.

Reproduced Output:

Using a video tape recorder "V500D", trademark for a product manufactured by Toshiba Corporation with a ferrite head, thus obtained video tapes were made run repeatedly at a rate of speed half of general rate, and the reproduced output at 0.7 μm recording wavelength was measured. The value was the relative value when the output value of Sample No. 5 was made 0 dB. The tapes having +2.5 dB or more of the output value are suitable for practical use.

The tape which had run for 10 passes on a video tape recorder ("V500D", trademark for a product manufactured by Toshiba Corporation) was made running under a temperature of 23° C. and humidity of 60% RH by a SUS pole (i.e., stainless steel pole) which was turning at a rate of speed of 1.5 cm/sec with the magnetic layer contacting the SUS pole at an angle of 180° having tension $T_1$ of 50 g, and then tension $T_2$ was read. In accordance with the formulation $$\mu = \frac{1}{\pi} \ln \frac{T_2}{T_1},$$

the friction coefficient was calculated. The tape having 0.30 or less of the friction coefficient are suitable for practical use.

Still Life:

Recorded signals were reproduced at a still mode and the reproduced RF output level was recorded by a recorder, and the time for the signal level to decrease to half of that was measured. In the Table, A indicates that no decrease of signal level was observed, while B indicates that a decrease of the signal level to half that of the original was observed.

It is clear from the Table that in a magnetic recording medium using conventionally used polyester type polyurethane, reproduced output was not so increased through ferromagnetic fine particles were employed. On the other hand, in a magnetic recording medium using polycarbonate polyurethane, remarkably high reproduced output was obtained.

The mixing ratio of binders to ferromagnetic particles is limited to a certain range. If the ratio of binders is lower than the limit, still life becomes undesirably shortened, while if it is higher, the friction coefficient becomes undesirably increased.

Further, the mixing ratio of polycarbonate polyurethane based on the total binder is limited to a certain range. If it is more than the limit, polycarbonate polyurethane affects runnability, and if it is lower than the limit, reproduced output becomes low.

Accordingly, high reproduced output as well as excellent running durability can be obtained in the magnetic recording medium according to the present invention.

Further, in accordance with the present invention, a low friction coefficient can be obtained as well as sufficient still life.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon a magnetic layer having magnetic particles dispersed in a binder, the magnetic particles being ferromagnetic hexagonal crystallized tabular shape particles having an axis of easy magnetization in a direction vertical to a flat surface thereof, said binder being present in an amount of from 10 to 30 wt% based on the weight of the magnetic particles, and said binder comprising a polycarbonate polyurethane being present in an amount of from 20 to 60 wt%, a vinyl chloride and vinyl acetate copolymer being present in an amount of from 20 to 70 wt%, and a polyisocyanate being present in an amount of from 10 to 60 wt%, based on the total amount of binder.

2. A magnetic recording medium as in claim 1, wherein the binder is present in an amount of from 15 to 25 wt% based on the weight of the magnetic particles.

3. A magnetic recording medium as in claim 1, wherein the polycarbonate polyurethane is present in an amount of from 25 to 50 wt%, the vinyl chloride and vinyl acetate copolymer is present in an amount of from 25 to 55 wt%, and the polyisocyanate is present in an amount of from 15 to 45 wt%, based on the total amount of binder.

4. A magnetic recording medium as in claim 2, wherein the polycarbonate polyurethane is present in an amount of from 25 to 50 wt%, the vinyl chloride and vinyl acetate copolymer is present in an amount of from 25 to 55 wt%, and the polyisocyanate is present in an amount of from 15 to 45 wt%, based on the total amount of binder.

5. A magnetic recording medium as in claim 1, wherein the ferromagnetic hexagonal crystallized tabular shape particles have a tabular diameter of from 0.01 to 10 μm, a tabular thickness of from 0.005 to 5 μm, and a tabular ratio of 2/1 or more.

6. A magnetic recording medium as in claim 1, wherein the ferromagnetic hexagonal crystallized tabular shape particles are Co-substituted barium ferrite and Co-substituted strontium ferrite.

7. A magnetic recording medium as in claim 1, wherein the ferromagnetic hexagonal crystallized tabular shape particles have a tabular diameter of from 0.03 to 0.10 μm, a tabular thickness of from 0.015 to 0.05 μm, and a tabular ratio of 2.5/1 to 10/1.

8. A magnetic recording medium as in claim 1, wherein the polycarbonate polyurethane is prepared by a condensation reaction of (1) a polyol (2) a polyisocyanate and (3) a chain-extending agent, wherein:

the (1) polyol is a polycarbonate polyol, a polyester polyol, or other polyol, wherein the polycarbonate polyol is obtained by a condensation reaction of a polyhydric alcohol, a diol or a derivative thereof and a compound selected from the group consisting of phosgene, a chloroacetic acid ester, a dialkyl carbonate or a diallyl carbonate, wherein the polyhydric alcohol has a molecular weight of 300 to 20,000 and the hydroxyl value of 20 to 300 and is represented by formula (I):

HO—R—OH (I)

wherein R represents

$+CH_2+_n$ (n = 3 to 14),

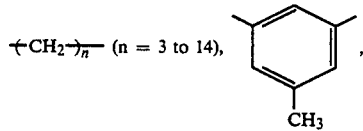

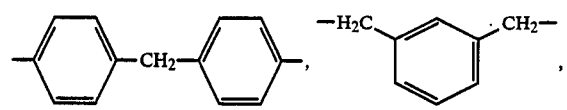

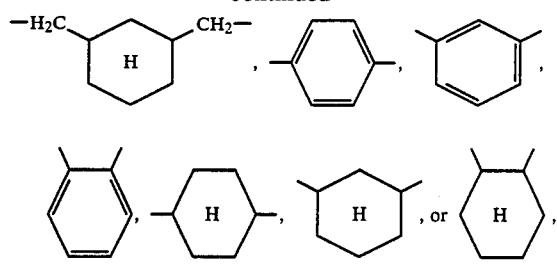

and wherein the diol is obtained by an addition reaction of a primary amine having the formula $(C_nH_{2n+1}—NH_2)$, where n is from 1 to 20, with 2 to 50 mols of an alkylene oxide, and wherein the polyester polyol is obtained by a condensation reaction of said polycarbonate polyol with a compound represented by formula (II):

HOOCR'COOH (II):

wherein R' represents

$+CH_2+_n$ (n = 3 to 6),

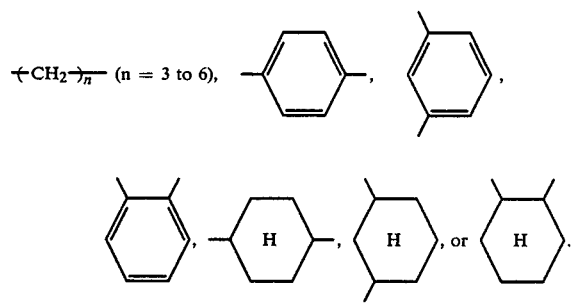

the (2) polyisocyanate is selected from the group consisting of hexamethylene diisocyanate, lysine diisocyanate, isophorone diisocyanate, xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, and 1,5-naphthylene diisocyanate;

the (3) chain-extending agent is a polyhydric alcohol, an aliphatic polyamine, an alicyclic polyamine or an aromatic polyamine;

the vinyl chloride and vinyl acetate copolymer is selected from the group consisting of a copolymer of vinyl chloride and vinyl acetate, a copolymer of vinyl chloride, vinyl acetate and vinyl alcohol, and a copolymer of vinyl chloride, vinyl acetate and maleic anhydride.

* * * * *